United States Patent [19]
Harada et al.

[11] Patent Number: 5,187,022
[45] Date of Patent: Feb. 16, 1993

[54] MAGNETIC RECORDING MEDIUM FOR ENCODERS

[75] Inventors: Mutsumi Harada; Nobuji Kato; Yoshinori Hayashi; Toshiharu Hoshi; Kenzaburo Iijima, all of Shizuoka, Japan

[73] Assignee: Yamaha Corporation, Japan

[21] Appl. No.: 490,934

[22] Filed: Mar. 8, 1990

[30] Foreign Application Priority Data

Mar. 8, 1989 [JP] Japan ........................ 1-55578

[51] Int. Cl.$^5$ .............................................. G11B 5/66
[52] U.S. Cl. ................................. 428/694; 428/678;
428/900; 360/131; 360/135; 369/275.1;
369/275.2; 369/275.3
[58] Field of Search ............... 428/694, 900, 692, 323,
428/611, 678; 369/275.1, 275.2, 275.3; 360/131, 135

[56] References Cited

U.S. PATENT DOCUMENTS 4,042,341  8/1977  Smeggil .......................... 428/694
4,414,287 11/1983  Kneller et al. .................. 428/694
4,846,942  7/1989  Watanabe et al. ............... 204/58.5

FOREIGN PATENT DOCUMENTS

60-16409  6/1985  Japan.
3-200011  9/1991  Japan.

*Primary Examiner*—Paul J. Thibodeau
*Assistant Examiner*—R. Follett
*Attorney, Agent, or Firm*—Ostrolenk, Faber, Gerb & Soffen

[57] ABSTRACT

To construct a magnetic recording medium to be used for an encoder adapted for detection of an angular or linear displacement of a mobile object such as a robot arm, a substrate is at least partly covered with a Sm-Co alloy thin layer bearing magnetic information with a magnetization pitch which is at least three times as large as the crystal diameter of the magnetic particles in the alloy. A resultant high coercive force obtained with that alloy allows detection with an enlarged detective distance, and the above-mentioned proper ratio of crystal diameter with respect to the magetization pitch allows detection with low percentage of output variation, thereby enabling easy assembly of the encoder and detection with high precision.

10 Claims, 7 Drawing Sheets

MAGNETIC RECORDING MEDIUM FOR ENCODERS

BACKGROUND OF THE INVENTION

The present invention relates to a magnetic recording medium for encoders, and more particularly relates to a magnetic recording medium advantageously used for a high precision encoder which is used as a mechatronics sensor for detection of displacement of an arm of a robot.

The most typical conventional magnetic recording medium for this application is made up of a substrate and a thin magnetic layer deposited on the substrate and the magnetic layer is made of ferrite, Fe—Cr—Co alloy or rare earth bonded magnet.

When ferrite or Fe—Cr—Co is used, their relatively low coercive force (Hc) or low (BH) max allows generation of low intensity outputs only. As a consequence, the distance between a magnetic recording medium and an associated magnetic sensor must be as small as one half of the magnetization pitch of the information stored in the recording medium. In order to successfully provide such a small detective distance, the assembly of the encoder has to be carried out with an extremely high precision. In addition, it is almost unfeasible in practice to make the detective distance so small as required from the above-described view point of material. For these reasons, there is no other choice but to adopt a relatively large magnetization pitch of the information to be stored in the recording medium. Such an enlarged magnetization pitch, however, inevitably prevents detection of displacement of a mobile object with high precision.

Use of rare earth bonded magnet removes the problem of the small detective distance thanks to its relatively high coercive force. Despite that merit, use of this material is accompanied with a great disadvantage resulted from particle size distribution of magnet particles dispersed in the binder of the magnet. That is, uneven particle size distribution tends to cause undesirable disorder in lines of magnetic force generated by the magnetic recording medium. Such uneven distribution inevitably results in low precision in detection of displacement.

SUMMARY OF THE INVENTION

It is the object of the present invention to provide a magnetic recording medium of high coercive force which assures high precision in detection of displacement.

In accordance with a basic aspect of the present invention, a thin layer of Sm—Co alloy is deposited on a substrate and bears magnetic information at a magnetization pitch which is at least three times as large as the crystal diameter of magnet particles in said alloy.

DESCRIPTION OF THE PREFERRED EMBODIMENTS

Figure 1:
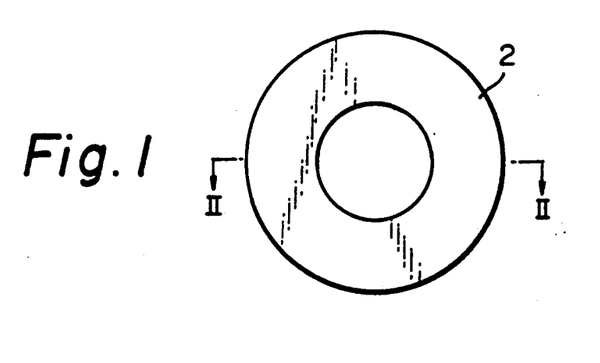
FIG. 1 is a plan view of one embodiment of the magnetic recording medium in accordance with the present invention.
Figure 2:
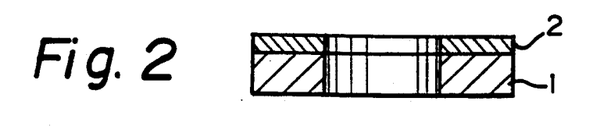
FIG. 2 is a section taken along a line II—II in FIG. 1.

One embodiment of the magnetic recording medium in accordance with the present invention is shown in FIGS. 1 and 2 in which a Sm—Co alloy thin layer 2 is deposited on a flat substrate 1 and magnetic information is stored in the thin layer with a magnetization pitch which is three times or larger than the crystal diameter of the thin layer. This magnetic recording medium is advantageously adapted for an encoder used for detection of angular displacement of a rotary object.

In the example shown, the substrate is given in the form of an annular plate made of metal such as copper or copper alloys or glass.

The thin layer is made of a Sm—Co alloy containing 2 to 20 atom percent of Sm. The thickness of the thin layer is in a range from 10 to 300 μm. The thin layer should preferably exhibit a high coercive force of 2000 Oe or higher, and more preferably in a range from 3000 to 5000 Oe. Any coercive force below 2000 Oe would produce low intensity output. Whereas, no successful magnetization is resulted in practice when the coercive force exceeds 5000 Oe. However, the coercive may be more or less higher than this upper limit depending on the process condition in magnetization.

Magnetic information should be stored in the thin layer with a magnetization pitch which is three times or larger than the crystal diameter of magnet particles in alloy. As stated in more detail later, any magnetization pitch smaller than this lower limit would make the resultant output variation exceed 5%.

The Sm—Co alloy thin layer is formed on the substrate by means of the ordinary sputtering or electric plating process which is followed by optional heating process. Process conditions are adjusted so as to suffice to satisfy the above-described functional requirements. In use, the Sm—Co alloy thin layer 2 is positioned, after magnetization of proper magnetic information, facing an object whose displacement should be detected.

Figure 3:
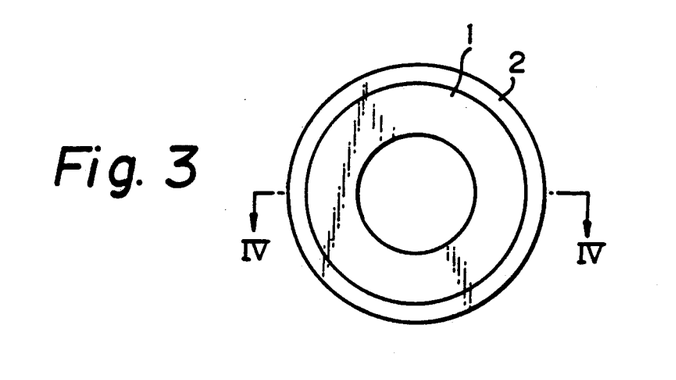
FIG. 3 is a plan view of another embodiment of the magnetic recording medium in accordance with the present invention.
Figure 4:
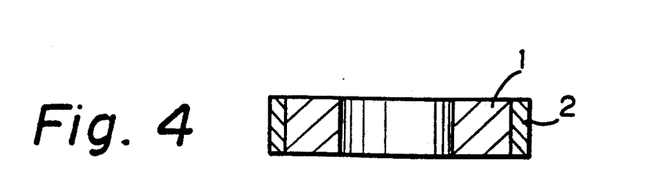
FIG. 4 is a section taken along a line IV—IV in FIG. 3.

Another embodiment of the magnetic recording medium in accordance with the present invention is shown in FIGS. 3 and 4 in which the Sm—Co alloy thin layer 2 is given in the form of an annular band deposited along the outer periphery of the annular substrate 1. In this case the thin layer is suited for vertical magnetization which assures high density recording for high precision detection of displacement.

The magnetic recording media shown in FIGS. 1 to 4 are suited for detection of a rotary displacement of a mobile object.

Figure 5:
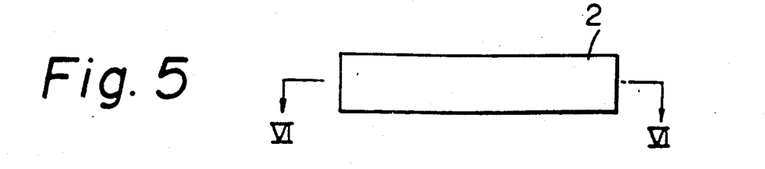
FIG. 5 is a plan view of the other embodiment of the magnetic recording medium in accordance with the present invention.
Figure 6:
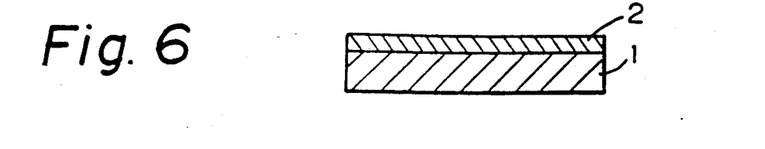
FIG. 6 is a section taken along a line VI—VI in FIG. 5.

Another embodiment of the magnetic recording medium in accordance with the present invention is shown in FIGS. 5 and 6 in which the substrate 1 is in the form of a rectangular plate. This magnetic recording medium is suited for detection of a linear displacement of a mobile object.

In accordance with the present invention, presence of a Sm—Co thin layer on a substrate assures generation of high intensity outputs which removes the need for minimal detective distance. As a consequence, encoders can be constructed easily. Thanks to the uniform and high coercive force resulted from use of the Sm—Co alloy, disorder in lines of magnetic force to be generated by the magnetic recording medium can be successfully avoided, thereby enhancing precision in detection greatly. By adjusting the magnetization pitch of the information to be stored, the output variation can be suppressed below 5%, thereby assuring correct detection of displacement.

EXAMPLES

EXAMPLE 1

Sm—Co alloy was deposited on an annular copper substrate for a thickness of 55 μm by means of an electric plating process to form a magnetic recording medium such as the one shown in FIGS. 1 and 2. It was confirmed by measurement that the crystal diameter of the alloy was in a range from 10 to 30 μm, the coercive force exhibited by the product was 3500 Oe and the magnetic flux density was 4500 G.

Comparative Example 1

Ferrite was deposited on a substrate in the same manner as that employed in Example 1. The coercive force of the product was 1850 Oe.

Comparative Example 2

Fe—Cr—Co alloy was deposited on a substrate in the same manner as that employed in Example 1. The coercive force of the product was 400 Oe.

Comparative Example 3

Rare earth bonded magnet was deposited on a substrate in the same manner as that employed in Example 1. The coercive force of the product was 4100 Oe.

Test 1

Figure 7:
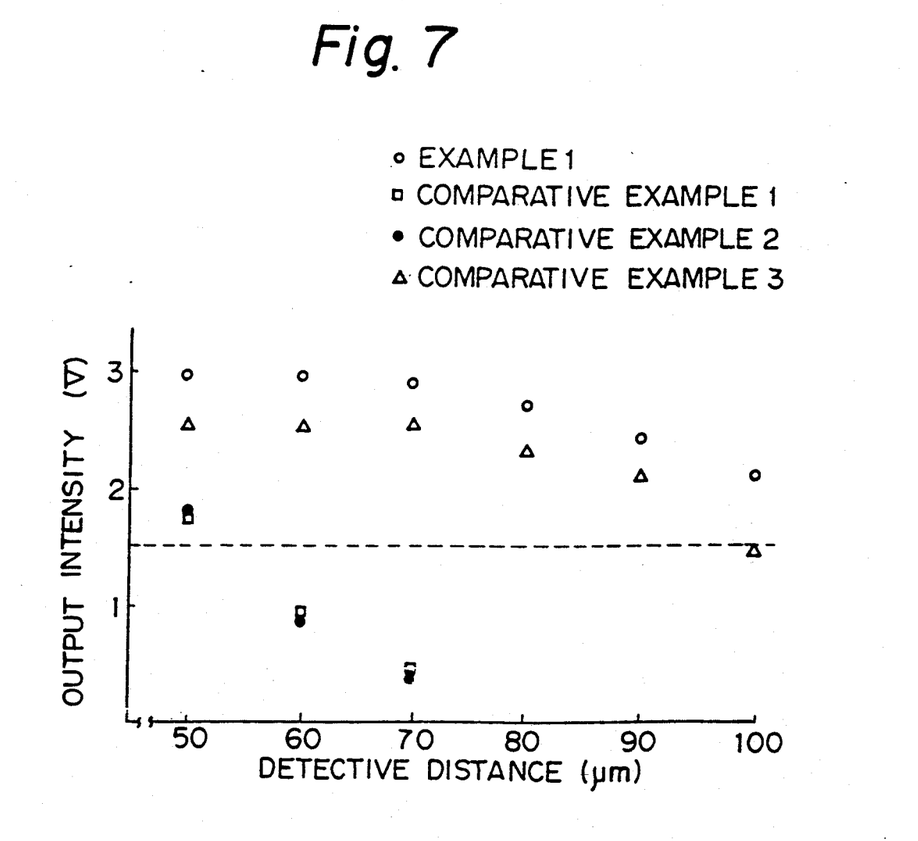
FIG. 7 is a graph for showing the relationship between the detective distance and the intensity of the sensor output.

Magnetic information was stored in the magnetic recording media of the foregoing Examples, respectively, with a magnetization pitch of 100 μm to form encoders for detection of displacement. Output intensity of each encoder was measured while varying the detective distance as shown in FIG. 7. In the illustration, ○ indicates the results with the magnetic recording medium of Example 1, □ indicates those with the magnetic recording medium of Comparative Example 1, ● indicates those with the magnetic recording medium of Comparative Example 2 and Δ indicates those with the magnetic recording medium of Comparative Example 3. It is confirmed from the graphic data that an increase in detective distance caused no extreme virtual lowering in output intensity in the cases of Example 1 and Comparative Example 3, both exhibiting high coercive forces. It is also confirmed that, when the minimum necessary output intensity is equal to 1.5 V, the magnetic recording medium in accordance with the present invention could generate an output of sufficiently high intensity even with a detective distance of 100 μm which is equal to the magnetization pitch of the magnetic information stored therein.

Test 2

Figure 8:
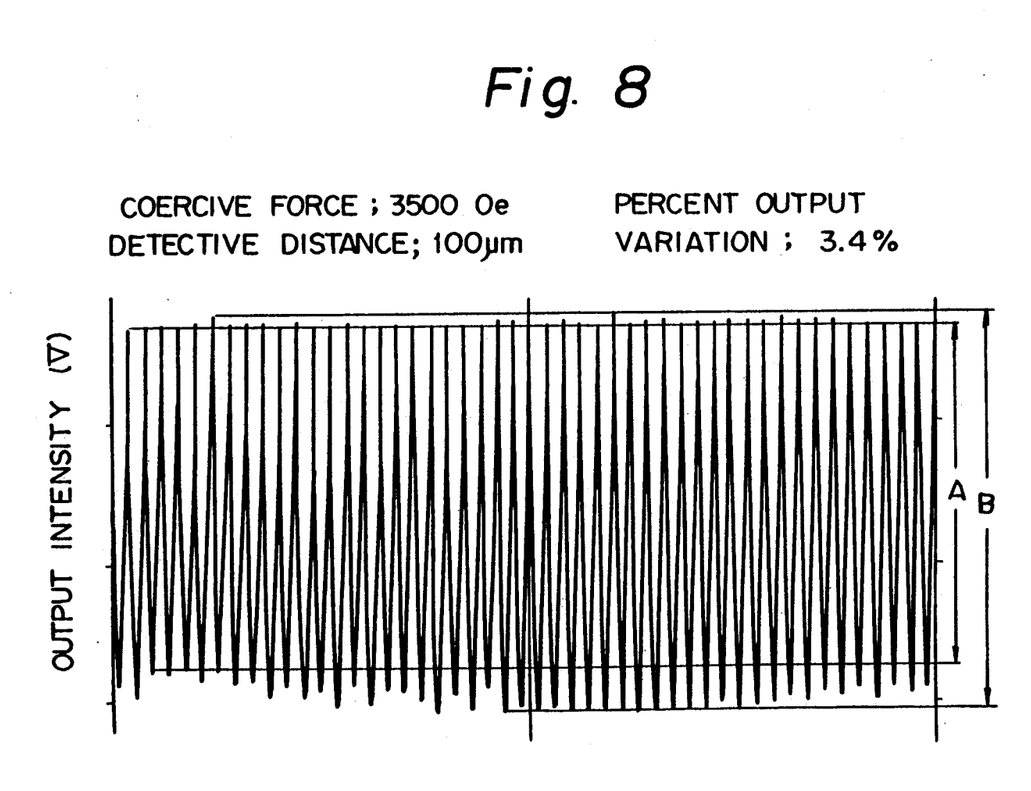
FIG. 8 is a diagram of the output wave shape generated by the magnetic recording medium in accordance with the present invention.
Figure 9:
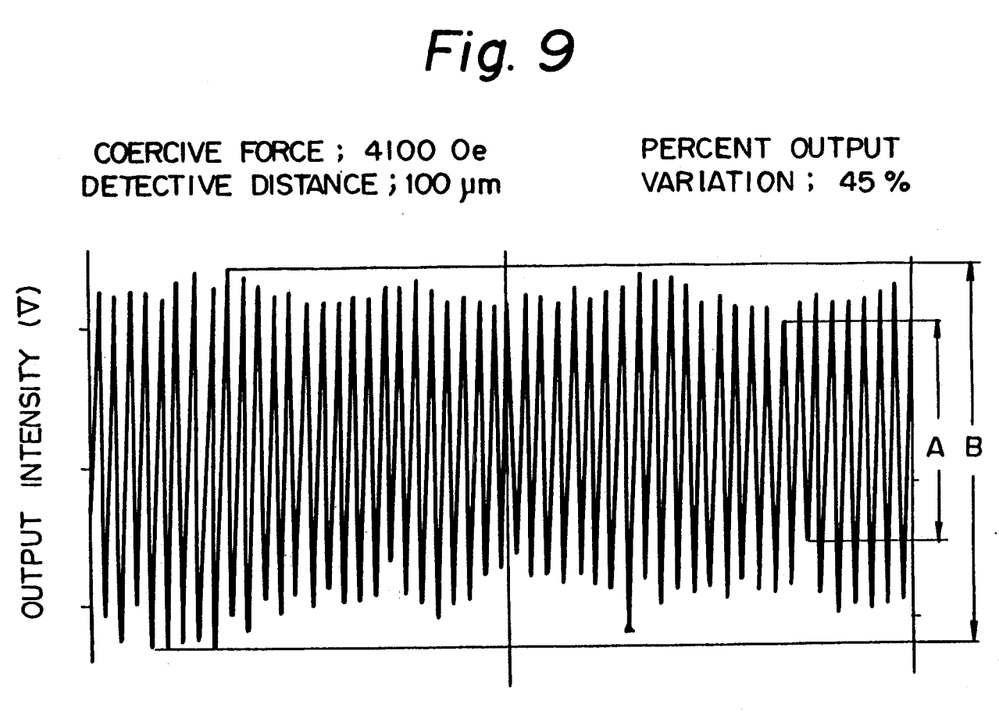
FIGS. 9 to 11 are diagrams of the output wave shape generated by the conventional magnetic recording media.
Figure 10:
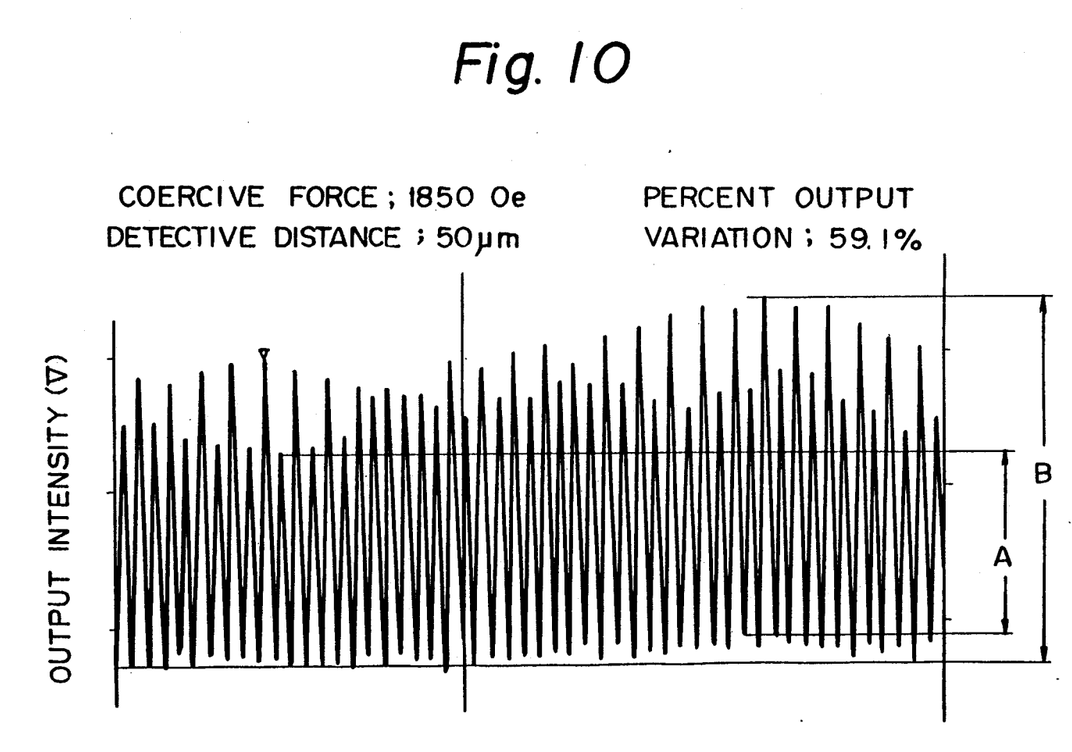
Figure 11:
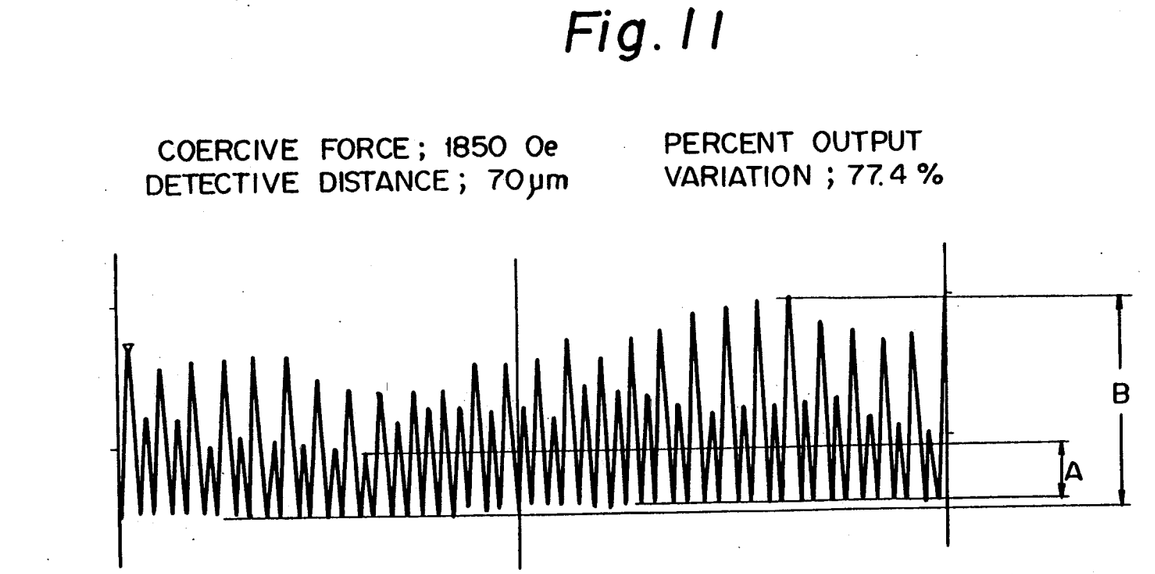

As in Example 1, magnetic information was stored with a magnetization pitch of 100 μm. Outputs from each magnetic recording medium were measured by a magnetic sensor located at a point 100 μm from the face of the magnetic recording medium while rotating the latter over one complete cycle and the results are shown in FIGS. 8 to 11. FIG. 8 is for Example 1 and FIG. 9 is for Comparative Example 3. Since no noticeable outputs were obtained with the above-described detective distance for Comparative Example 1, FIG. 10 shows the results with a detective distance of 70 μm and FIG. 11 shows those with a 50 μm distance. In the illustration, B indicates the maximum amplitude of the output intensity and A the minimum. The percent output variation is given by the formula $100(B-A)/B$. It is confirmed from the graphic data that the percent output variation is equal to 3.4% for Example 1 and this value is by far lower than the tolerable upper limit 5%.

Test 3

Figure 12:
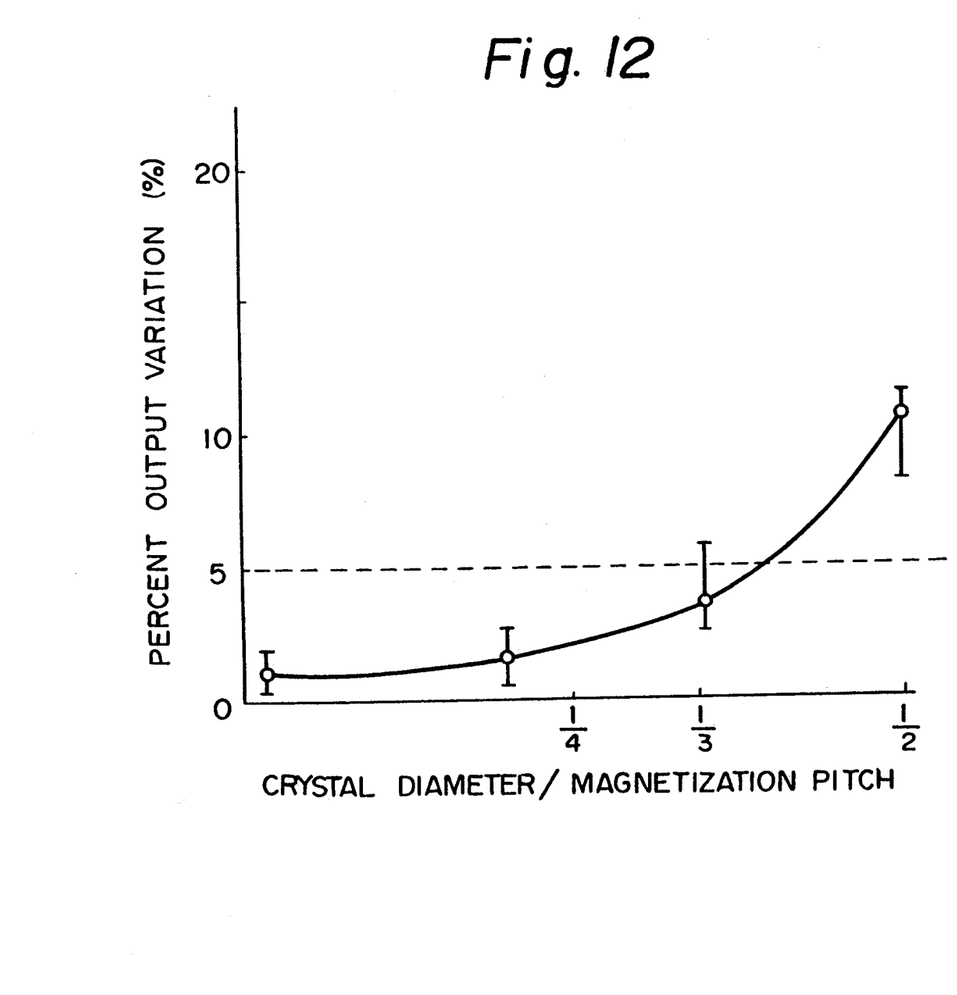
FIG. 12 is a graph for showing the relationship between the ratio of crystal diameter with respect to the magnetization pitch and the percent variation of output generated by the magnetic recording medium in accordance with the present invention.

The magnetic recording medium of Example 1 was subjected to heat treatment to cause a change in the crystal diameter of the Sm—Co alloy. Further, various magnetization pitches were employed in storing magnetic information and the results are shown in FIG. 12. It is confirmed from the graphic data that the magnetization pitch should be three times or larger than the crystal diameter of the alloy.

We claim:

1. A magnetic recording medium for encoders comprising
   a substrate, and
   a thin layer of Sm—Co alloy which exhibits a coercive force of no greater than about 5000 Oe deposited on said substrate and bearing magnetic information at a magnetization pitch which is at least three times as large as the crystal diameter of magnet particles in said alloy.

2. A magnetic recording medium as claimed in claim 1 in which said Sm—Co alloy contains 2 to 20 atom percent of Sm.

3. A magnetic recording medium a claimed in claim 1 in which
   the thickness of said thin layer is in a range from 10 to 300 μm.

4. A magnetic recording medium as claimed in claim 1 in which
   said thin layer exhibits a coercive force of 200 Oe or higher.

5. A magnetic recording medium as claimed in claim 4 in which said coercive force is in a range from 3000 to 5000 Oe.

6. A magnetic recording medium as claimed in claim 1 in which said substrate is in the form of an annular plate.

7. A magnetic recording medium as claimed in claim 6 in which
   said thin layer is deposited on an entire face of said substrate.

8. A magnetic recording medium as claimed in claim 6 in which
   said thin layer is deposited in the form of an annular band along the outer periphery of said substrate.

9. A magnetic recording medium as claimed in claim 1 in which said substrate is in the form of a plate.

10. A magnetic recording medium as claimed in claim 9 in which said plate is substantially rectangular.

* * * * *